US012746777B2

(12) United States Patent
Chen et al.

(10) Patent No.: US 12,746,777 B2
(45) Date of Patent: Sep. 29, 2026

(54) RIM SPOKE

(71) Applicant: XIAMEN HONGJIWEIYE INDUSTRIAL CO., LTD., Fujian (CN)

(72) Inventors: Shunhe Chen, Xiamen (CN); Fugui Yu, Xiamen (CN); Wei Meng, Xiamen (CN); Na Zhang, Xiamen (CN)

(73) Assignee: XIAMEN HONGJIWEIYE INDUSTRIAL CO., LTD., Xiamen (CN)

( * ) Notice: Subject to any disclaimer, the term of this patent is extended or adjusted under 35 U.S.C. 154(b) by 217 days.

(21) Appl. No.: 18/730,650

(22) PCT Filed: Feb. 9, 2022

(86) PCT No.: PCT/CN2022/075691

§ 371 (c)(1),
(2) Date: Jul. 19, 2024

(87) PCT Pub. No.: WO2023/142160

PCT Pub. Date: Aug. 3, 2023

(65) Prior Publication Data

US 2025/0115075 A1 Apr. 10, 2025

(30) Foreign Application Priority Data

Jan. 25, 2022 (CN) ......................... 202210088345.1
Jan. 25, 2022 (CN) ......................... 202220206467.1

(51) Int. Cl.
*B60B 1/04* (2006.01)
*B60B 5/02* (2006.01)
*B60B 21/06* (2006.01)

(52) U.S. Cl.
CPC .............. *B60B 1/044* (2013.01); *B60B 1/042* (2013.01); *B60B 5/02* (2013.01); *B60B 21/064* (2013.01);

(Continued)

(58) Field of Classification Search
CPC ....... B60B 1/0284; B60B 1/041; B60B 1/042; B60B 1/043; B60B 1/044; B60B 1/045;
(Continued)

(56) References Cited

U.S. PATENT DOCUMENTS 5,110,190 A * 5/1992 Johnson .................. B60B 1/003 301/58
5,806,935 A * 9/1998 Shermeister .......... B60B 21/023 301/58

(Continued)

FOREIGN PATENT DOCUMENTS

CN 2229365 Y 6/1996
CN 106739765 A * 5/2017 ............... B60B 5/02

(Continued)

OTHER PUBLICATIONS

International Search Report and Written Opinion of the ISA issued in PCT/CN2022/075691, mailed Oct. 20, 2022; ISA/CN.

*Primary Examiner* — Kip T Kotter
*Assistant Examiner* — Taekwon Choi
(74) *Attorney, Agent, or Firm* — Harness, Dickey & Pierce, P.L.C.

(57) ABSTRACT

Provided is a rim spoke, including a spoke rope and nipples. Mounting heads are fixedly sleeved on both ends of the spoke rope; through mounting holes are formed in the nipples; the nipples are fixedly sleeved on the mounting heads by means of the mounting holes; and the spoke rope is made of a textile fiber material. When the textile fiber spoke rope in a high tension state is subjected to a heavy impact, part of an impact force is cushioned due to the flexibility and strength margin of the spoke rope itself, so that the original characteristics of the spoke rope can still be kept under an extreme impact force without irreversible deformation, thereby reducing riding failure rate of riding, (Continued)

ensuring the riding safety, reducing the daily maintenance requirement of a wheel, and reducing costs.

6 Claims, 4 Drawing Sheets

(52) U.S. Cl.
CPC ..... *B60B 2310/318* (2013.01); *B60B 2360/10* (2013.01)

(58) Field of Classification Search
CPC ... B60B 21/064; B60B 5/02; B60B 2310/318; B60B 2360/10
See application file for complete search history.

(56) References Cited

U.S. PATENT DOCUMENTS 6,036,279 A * 3/2000 Campagnolo ........... B60B 1/048 301/58
6,938,962 B1 * 9/2005 Schlanger ............. B60B 21/062 301/58
8,657,387 B2 * 2/2014 Schlanger ............... B60B 1/003 301/58
8,985,709 B2 * 3/2015 Schlanger ............. B60B 21/062 301/55
9,731,556 B2 * 8/2017 Martin ...................... B60B 9/26
2004/0155518 A1 * 8/2004 Schlanger ............. B60B 21/062 301/58
2007/0257548 A1 * 11/2007 Schlanger ............... B60B 1/041 301/58

FOREIGN PATENT DOCUMENTS

CN 108725087 A 11/2018
CN 214215357 U 9/2021
CN 113815348 A 12/2021
WO WO-03020535 A2 3/2003
WO WO-2010120986 A1 * 10/2010 ........... B60B 21/025
WO WO-2021218675 A1 11/2021

* cited by examiner

RIM SPOKE

CROSS-REFERENCE TO RELATED APPLICATION

This application is a national stage application of International Patent Application No. PCT/CN2022/075691, filed on Feb. 9, 2022, which claims priority of the Chinese Patent Application No. 202220206467.1, filed on Jan. 25, 2022 and priority of the Chinese Patent Application No. 202210088345.1, filed on Jan. 25, 2022, all of which are incorporated by references in their entities.

TECHNICAL FIELD

The present disclosure relates to the technical field of rim spokes, and in particular to a rim spoke.

BACKGROUND

One end of a rim spoke is connected to a rim, and the other end of the rim spoke is connected to a hub. The existing rim spoke generally is a spoke made of a rigid material, e.g., a steel spoke. When the tension of the spoke approaches the limit of the rigid material, the spoke will be deformed when subjected to a heavy impact, which will eventually result in the weakening of strength of the spoke and the hidden trouble of riding.

SUMMARY

An objective of the present disclosure is to provide a rim spoke. When a textile fiber spoke rope in a high tension state is subjected to a heavy impact, part of an impact force is cushioned due to the flexibility and strength margin of the spoke rope itself, so that the original characteristics of the spoke rope can still be kept under an extreme impact force without irreversible deformation, thereby reducing failure rate of riding, ensuring the riding safety, reducing the daily maintenance requirement of a wheel, and reducing costs.

To achieve the objective above, the present disclosure employs the following technical solution:

A rim spoke includes a spoke rope and nipples. Mounting heads are fixedly sleeved on both ends of the spoke rope; through mounting holes are formed in the nipples; and the nipples are fixedly sleeved on the mounting heads by means of the mounting holes.

Preferably, the spoke rope is made of a textile fiber material.

Preferably, the spoke rope is made by braiding of a plurality of textile fiber ropes.

Preferably, each of the mounting holes is a tapered hole with an inner diameter increasing from inside to outside, each of the mounting heads has a uniform outer diameter, and the outer diameter of each of the mounting heads is in fit with a maximum inner diameter of the mounting hole.

Preferably, an outer end of each of the nipples is provided with a threaded structure, and each of the nipples is inserted into a spoke hole of a rim or a hub to be in fit with a nut, so as to connect the spoke rope to the rim or the hub.

Preferably, each of the mounting heads is provided with a through sleeving hole, and an outer wall of each of the mounting heads is radially provided with a pressing opening communicating with the sleeving hole; an end of the spoke rope is inserted into the sleeving hole, the pressing opening forms a closed compact structure by means of an adhesive and pressing of a machine platform, and the closed compact structure is configured to fix the spoke rope.

Preferably, the mounting heads and the nipples are made of metal materials.

By adopting the technical solution, the present disclosure has the following beneficial effects compared with the background art:

1. The spokes in the prior art are generally made of rigid materials, and have poor buffering capacity when subjected to a heavy impact, which eventually leads to irreversible deformation. The present disclosure spans the technical blind area and creatively adopts flexible textile fiber spoke rope as a spoke material. Compared with the traditional rigid spoke which can only bear the ultimate tension of 2-3 kN, the textile fiber spoke rope can bear the ultimate tension of 6-8 kN. Moreover, the textile fiber spoke rope still maintains more strength margin while improving the tension and rigidity. When the textile fiber spoke rope in a high tension state is subjected to a heavy impact, part of an impact force is cushioned due to the flexibility and strength margin of the spoke rope itself, so that the original characteristics of the spoke rope can still be kept under an extreme impact force without irreversible deformation, thereby reducing failure rate of riding, ensuring the riding safety, reducing the daily maintenance requirement of a wheel, and reducing costs.
2. According to the rim spoke provided by the present disclosure, the rim made of the textile fiber spoke rope is light in weight, and can improve the riding comfort of a user when especially used with other carbon fiber wheel sets. Moreover, compared with the traditional rigid spoke, the rim spoke provided by the present disclosure is more environmentally friendly.
3. According to the rim spoke provided by the present disclosure, an end of the spoke rope is fixedly inserted into the sleeving hole of the mounting head by means of an adhesive and the pressing of a machine platform, the mounting hole on the nipple is a tapered hole with an inner diameter increasing from inside to outside, and an outer diameter of the mounting head is in fit with a maximum inner diameter of the mounting hole. Before the mounting of the mounting head, the nipple is sleeved on the spoke rope, and after the mounting head is fixed on the end of the spoke rope, the nipple is moved to make the mounting hole be tightly meshed with the mounting head. As the outer diameter of the mounting head is in fit with the maximum inner diameter of the mounting hole, during the moving of the nipple, the mounting hole gradually becomes smaller and is slightly deformed by the extrusion of the mounting head, leading to an increase in an outward extrusion force on the nut in fit with the mounting hole. The closer to the end of the spoke rope, the greater the extrusion force, which effectively prevents the hidden trouble caused by a situation that the nut loosens and falls off from the nipple due to the vibration of the spoke rope during riding. Moreover, the slight deformation of the mounting head also extrudes the sleeving hole, so that the mounting head is pressed against the end of the spoke rope.

DETAILED DESCRIPTION OF THE EMBODIMENTS

Figure 1:
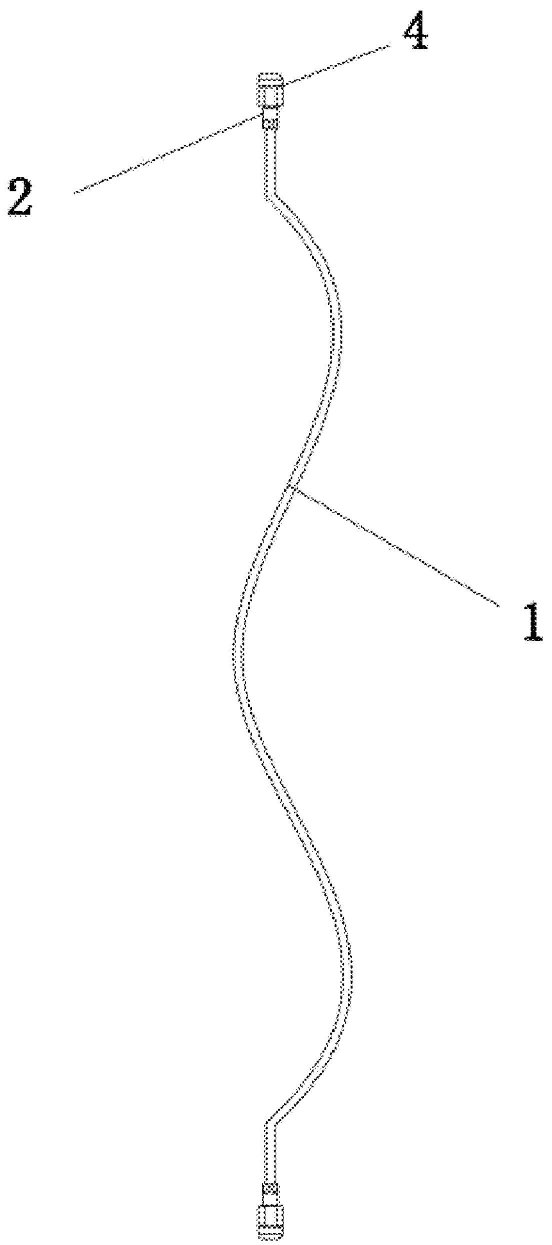
FIG. 1 is a schematic diagram of a structure according to the present disclosure.

In order to make the objectives, technical solutions and advantages of the present disclosure more clearly, the present disclosure is further described in detail below with reference to the accompanying drawings and the embodiments. It should be understood that specific embodiments described here are only used to illustrate rather than limiting the present disclosure.

In the description of the present disclosure, it needs to be understood that the orientation or positional relationship indicated by terms “upper”, “lower”, “left”, “right”, “vertical”, “horizontal”, “inside” and “outside” is based on the orientation or positional relationship shown in the drawings only for convenience of description of the present disclosure and simplification of description rather than indicating or implying that the apparatus or element referred to must have a particular orientation, be constructed and operate in a particular orientation, and thus are not to be construed as limiting the present disclosure.

EMBODIMENT

Figure 2:
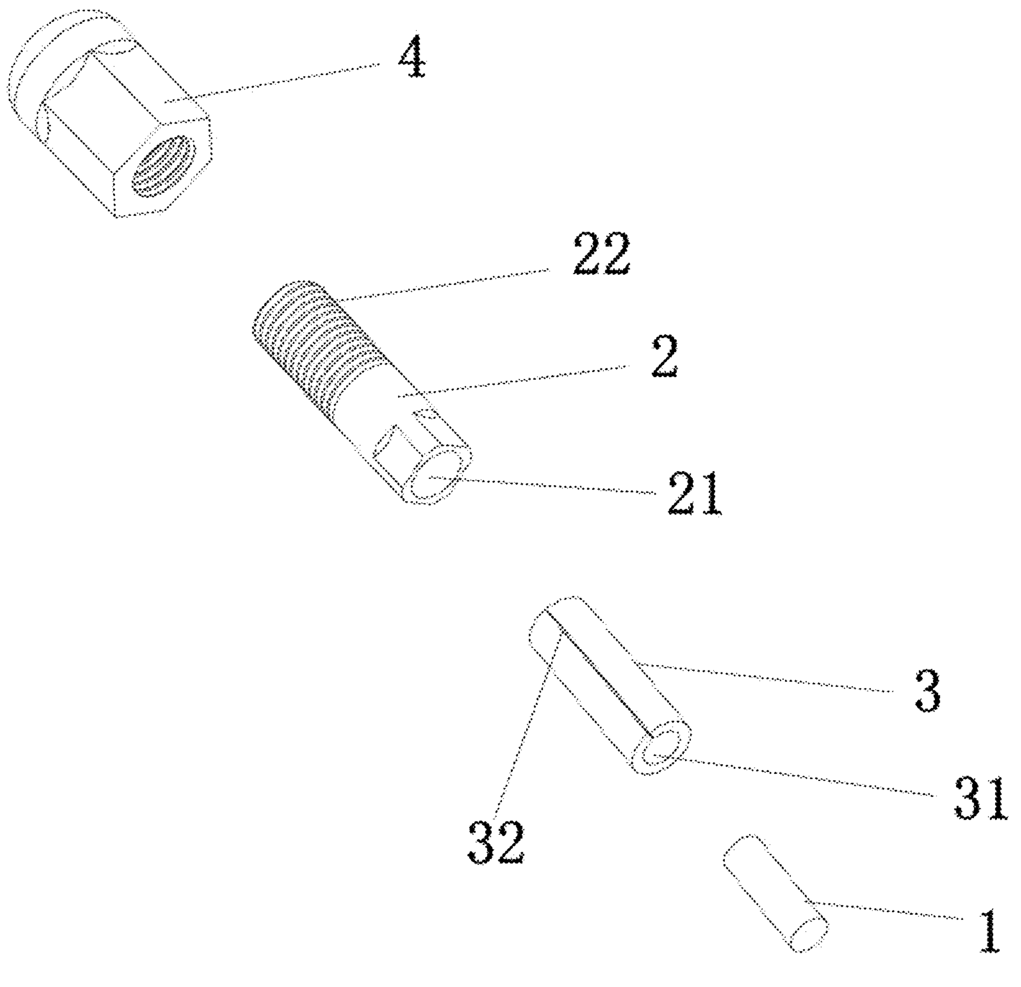
FIG. 2 is an exploded schematic diagram of a structure at an end of a spoke rope according to the present disclosure.
Figure 3:
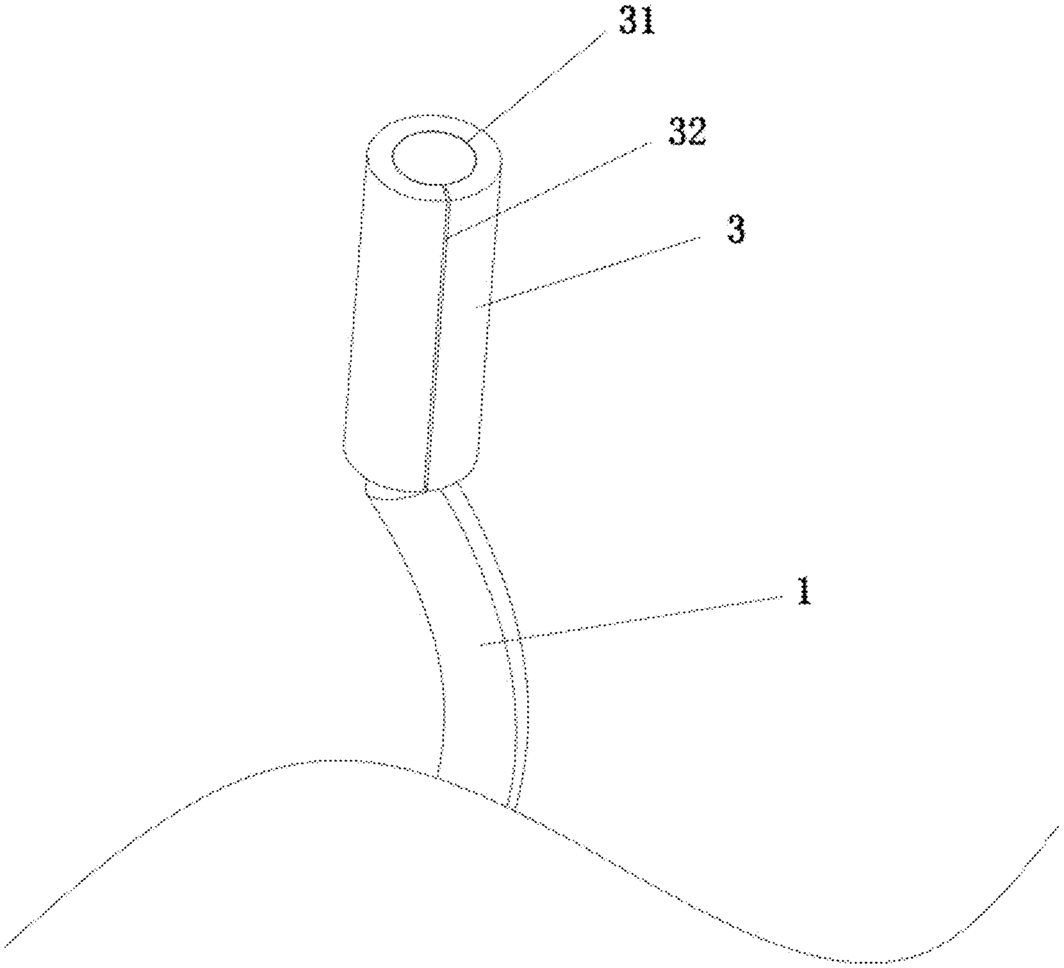
FIG. 3 is a schematic structural diagram of a connection part of a spoke rope and a mounting head according to the present disclosure.
Figure 4:
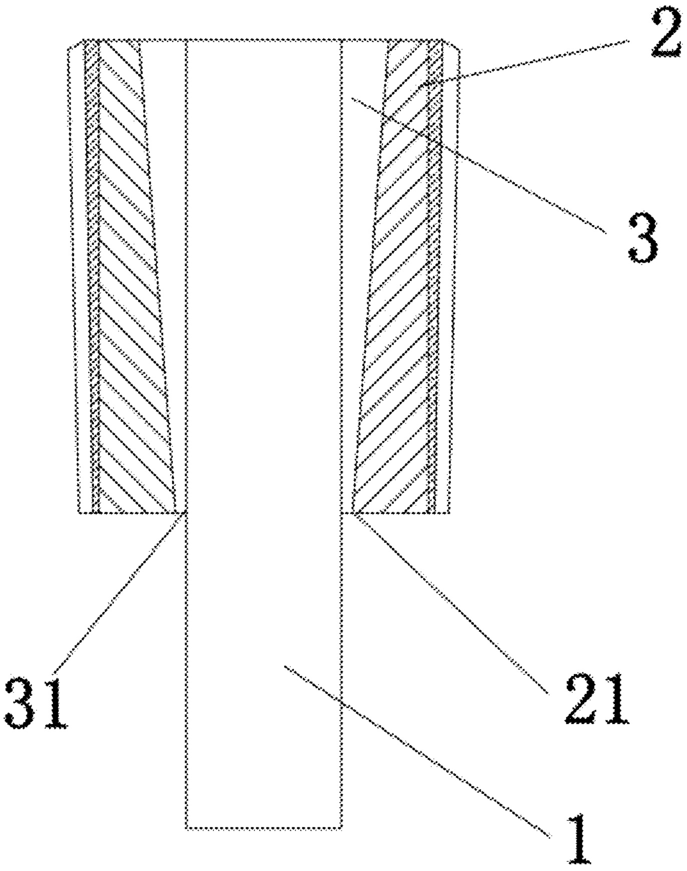
FIG. 4 is a structural sectional diagram of a connection part of a nipple and a mounting head according to the present disclosure.

Please referring to FIG. 1 to FIG. 4, a rim spoke is provided, including a spoke rope 1, and nipples 2. Both ends of the spoke rope 1 are fixedly sleeved with mounting heads 3. Through mounting holes 21 are formed in the nipples 2. The nipples 2 is fixedly sleeved on the mounting heads 3 by means of the mounting holes 21.

The spoke rope 1 is made of a textile fiber material. The surface of the spoke rope 1 is cut and polished to make the surface uniform, and the surface of the spoke rope 1 is free of being contaminated with excessive dirt due to the tension of the spoke rope 1 itself.

The spoke rope 1 is of a hollow braided structure and is made by braiding of multiple textile fiber ropes. In this embodiment, the textile fiber material is polyester fiber.

The mounting head 3 and the nipple 2 are made of metal materials. The mounting hole 21 is a tapered hole with an inner diameter increasing from inside to outside, the mounting head 3 has a uniform outer diameter, and the outer diameter of the mounting head 3 is in fit with a maximum inner diameter of the mounting hole 21. An outer end of the nipple 2 is provided with a threaded structure 22, and the nipple 2 is inserted into a spoke hole of the rim or a hub to be in fit with a nut 4, so as to connect the spoke rope 1 to the rim or the hub.

The mounting head 3 is provided with a sleeving hole 31, and an outer wall of the mounting head 3 is radially formed with a pressing opening 32 communicating with the sleeving hole 31. An end of the spoke rope 1 is inserted into the sleeving hole 31. The pressing opening 32 forms a closed compact structure by means of an adhesive and pressing of a machine platform, so as to fix the spoke rope 1, thus ensuring that the mounting head 3 is firmly sleeved on the end of the spoke rope.

Before the mounting of the mounting head 3, the nipple 2 is sleeved on the spoke rope 1, and after the mounting head 3 is fixed on the end of the spoke rope, the nipple 2 is moved to make the mounting hole 21 be tightly meshed with the mounting head 3. As the outer diameter of the mounting head 3 is in fit with the maximum inner diameter of the mounting hole 21, during the moving of the nipple 2, the mounting hole 21 gradually becomes smaller and is slightly deformed by the extrusion of the mounting head 3, leading to an increase in an outward extrusion force on the nut 4 in fit with the mounting hole. The closer to the end of the spoke rope 1, the greater the extrusion force, which effectively prevents the nut 4 from falling off from the nipple 2 due to the vibration of the spoke rope 1 during riding. Moreover, the slight deformation of the mounting head 3 also extrudes the sleeving hole 31, so that the mounting head 3 is pressed against the end of the spoke rope 1.

The above is only the specific implementation of the present disclosure, but the scope of protection of the present disclosure is not limited thereto. Any change or substitution that can be easily thought of by any person skilled in the art within the technical scope disclosed in the present disclosure should be covered by the scope of protection of the present disclosure. Therefore, the scope of protection of the present disclosure shall be subject to the that of the appended claims.

What is claimed is:

1. A rim spoke, comprising a spoke rope and nipples, wherein mounting heads are fixedly sleeved on both ends of the spoke rope; through mounting holes are formed in the nipples; and the nipples are fixedly sleeved on the mounting heads by means of the mounting holes, wherein each of the mounting holes is a tapered hole with an inner diameter increasing from inside to outside, each of the mounting heads has a uniform outer diameter, and the outer diameter of each of the mounting heads is in fit with a maximum inner diameter of the mounting hole.

2. The rim spoke according to claim 1, wherein the spoke rope is made of a textile fiber material.

3. The rim spoke according to claim 2, wherein the spoke rope is made by braiding of a plurality of textile fiber ropes.

4. The rim spoke according to claim 1, wherein an outer end of each of the nipples is provided with a threaded structure.

5. The rim spoke according to claim 1, wherein each of the mounting heads is provided with a through sleeving hole, and an outer wall of each of the mounting heads is radially provided with a pressing opening communicating with the sleeving hole; an end of the spoke rope is inserted into the sleeving hole, the pressing opening forms a closed compact structure by means of an adhesive and pressing of a machine platform, and the closed compact structure is configured to fix the spoke rope.

6. The rim spoke according to claim 1, wherein the mounting heads and the nipples are made of metal materials.

* * * * *